(12) United States Patent
Ishino et al.

(10) Patent No.: US 6,579,943 B1
(45) Date of Patent: *Jun. 17, 2003

(54) METHOD OF PRODUCING MODIFIED POLYESTER MOULDED ARTICLES, AND SAID MOULDED ARTICLES

(75) Inventors: K Ishino, Kyoto (JP); Takatoshi Ku-Ratsuji, Kyoto (JP)

(73) Assignee: Elf Atochem S.A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,524
(22) PCT Filed: Mar. 15, 1999
(86) PCT No.: PCT/EP99/02052
§ 371 (c)(1),
(2), (4) Date: Jun. 26, 2000
(87) PCT Pub. No.: WO99/47604
PCT Pub. Date: Sep. 23, 1999

(30) Foreign Application Priority Data

Mar. 13, 1998 (JP) .......................................... 10-061830

(51) Int. Cl.$^7$ ............................................... C08L 67/02
(52) U.S. Cl. .......................... 525/166; 525/64; 525/176
(58) Field of Search ........................... 525/166, 64, 176

(56) References Cited

U.S. PATENT DOCUMENTS

| | | | | | |
|---|---|---|---|---|---|
| 4,172,859 A | * | 10/1979 | Epstein | ...................... | 428/402 |
| 5,086,117 A | * | 2/1992 | Ohmae | ...................... | 525/166 |
| 5,208,292 A | * | 5/1993 | Hert | ...................... | 525/166 |
| 5,254,626 A | * | 10/1993 | Penco | ...................... | 525/166 |
| 6,020,414 A | * | 2/2000 | Nelsen | ...................... | 524/424 |

FOREIGN PATENT DOCUMENTS

| | | |
|---|---|---|
| EP | 0 536 966 | 4/1993 |
| EP | 0 747 070 | 12/1996 |
| JP | 1-247454 | * 10/1989 |

* cited by examiner

*Primary Examiner*—Patricia A. Short
(74) *Attorney, Agent, or Firm*—Millen, White, Zelano & Branigan, P.C.

(57) ABSTRACT

A method of producing modified polyester moulded articles which is characterized in that, when producing moulded articles from a modified polyester composition comprising a polyester composed of an acid component chiefly consisting of aromatic dicarboxylic acid and glycol component chiefly consisting of aliphatic diol, and a modified polyolefin, there is incorporated an ethylene-acrylate copolymer; together with the moulded articles produced thereby.

30 Claims, No Drawings

METHOD OF PRODUCING MODIFIED POLYESTER MOULDED ARTICLES, AND SAID MOULDED ARTICLES

BACKGROUND OF THE INVENTION

The present invention relates to a method of producing modified polyester moulded articles and to the moulded articles obtained thereby. The objective thereof lies in offering a method of producing moulded articles which, while still maintaining their low-temperature impact resistance or moist heat resistance, are also outstanding in their injection moulding and extrusion moulding properties and, furthermore, even when deformed do not undergo phase separation or fibrillation; together with the moulded articles formed thereby.

On account of their outstanding chemical and mechanical properties, polyesters have long been widely used in applications of various kinds such as fibres, films, industrial resins and bottles. These polyesters have in recent years come to be used under severe conditions, not just for motor vehicle and electrical/electronic components in particular, but also for industrial applications in general. In such applications, conventional polyesters have inadequate low-temperature impact resistance and they are susceptible to hydrolysis under high humidity and high temperature conditions, so there have been restrictions on their use.

For the improvement of the low-temperature impact strength of polyester resins, there has to some extent been employed the incorporation of core/shell type impact absorbing agents in which a rubber or the like is used as one component, or the incorporation of a modified polyolefin having functional groups which react with the polyester terminals.

On the other hand, in regard to the hydrolysis of polyesters, it has long been known that this problem is promoted by terminal carboxyl groups and, in order to overcome it, there are methods such as suppressing the terminal carboxyl group concentration by low-temperature melt polymerization and solid phase polymerization, or by adding a compound which reacts with the terminal carboxyl groups such as alkaline compounds, diglycidyl terephthalate, polycarbodiimide, ethylene carbonate and imidazoline compounds. Of these methods, some have already been employed on a practical basis. However, with an approach based on the method of polymerization, productivity is inevitably sacrificed to some extent, while in the case where a reactive compound is added, problems arise such as the adverse effects caused by the low molecular weight materials produced as a result of the reaction or decomposition at the time of melt fabrication, and so further improvements are demanded in relation to applications where used under more severe conditions.

In order to resolve such problems, there is known the incorporation of a polyolefin which has been modified by means of glycidyl groups or the like, so as to reduce the terminal carboxyl groups concentration by reaction therewith and, furthermore, so as to reduce the viscosity at the time of melt fabrication. In such circumstances, if, for example, an ethylene-alkylÿacrylate-glycidyl terpolymer is used in order to lower the glass transition point at the same time, or to further increase the compatibility with the polyester, the acrylate partially decomposes during the melt fabrication and carboxyl groups are newly produced, which then promote the polyester hydrolysis. In order to prevent such a problem, the modified polyolefin has to be restricted to an ethylene-glycidyl copolymer which is not a terpolymer containing alkyl acrylate. However, when an ethylene-glycidyl copolymer is used, while there is reaction with the molecular terminals of the polyester, there is inadequate compatibility between the polyethylene regions and the polyester, and phase separation occurs when the moulded article is subjected to bending or other such repeated deformation during use. In certain circumstances, fibrillation occurs, so that not only is the appearance of the moulded article impaired but the product performance is also lowered, and so a resolution of this difficulty has been demanded.

SUMMARY OF THE INVENTION

As a result of a painstaking investigation aimed at obtaining moulded articles which, while maintaining their low-temperature impact resistance and moist heat resistance, are also resistant to flexural fatigue, the present inventors have discovered that this objective is realised by incorporating an ethylene copolymer at the same time as the glycidyl copolymer, and it is on this discovery that the present invention is based.

The present invention is a method of producing modified polyester moulded articles which is characterized in that, when producing moulded articles from a modified polyester composition comprising a polyester composed of an acid component chiefly consisting of aromatic dicarboxylic acid and a glycol component chiefly consisting of aliphatic diol, and a modified polyolefin, there is incorporated an ethylene-acrylate copolymer; together with the moulded articles produced thereby.

In the present invention, 'polyester' is a polyester composed of an acid component chiefly consisting of aromatic dicarboxylic acid and a glycol component chiefly consisting of aliphatic diol. As examples of the 'aromatic dicarboxylic acid', there are terephthalic acid, naphthalene dicarboxylic acid, isophthalic acid, diphenyl dicarboxylic acid, diphenyl ether dicarboxylic acid, diphenyl sulphone dicarboxylic acid and diphenyl ketone dicarboxylic acid. As examples of the 'aliphatic diol', there are ethylene glycol, trimethylene glycol, tetramethylene glycol and hexamethylene glycol. Here, 'chiefly' is not particularly restricted but broadly means 80 mol %. Other acid component or hydroxy component may be copolymerized within a range below 20 mol %. Again, there can also be used a polyfunctional compound with three or more functional groups, within a range such that the polyester remains substantially linear. Amongst the aforesaid polyesters, polyethylene terephthalate, polyethylene naphthalate and polybutylene terephthalate are preferred. Such polyester is produced by a conventional melt polymerization method but, where required, may also be based on a solid phase polymerization method.

In the present invention, 'modified polyolefin' is a polyolefin which has undergone graft- or co-polymerization with an unsaturated epoxide or derivative thereof. A polyolefin which is a graft- or co-polymer of an unsaturated acid or anhydride or other derivative thereof, although it is a modified polyolefin nevertheless lies outside the scope of this invention. The reason for this is because the carboxyl groups produced as a result of reaction with the polyester will promote the hydrolysis of the polyester. As specific examples of modified polyolefins which have been modified by means of an unsaturated epoxy, there are ethylene-glycidyl copolymer, propylene-glycidyl terpolymer, butylene-glycidyl copolymer and the like. Of these, the terpolymer has inferior heat resistance compared to the copolymers, so the copolymers are preferred and ethylene-glycidyl copolymer is particularly preferred. These are polymerized by conventional methods.

In the present invention, the proportion of the polyester composition represented by said modified polyolefin will differ depending on the application but, normally, it is no more than 30 wt % and preferably no more than 20 wt %.

In the present invention, 'ethylene-acrylate' copolymer is a copolymer chiefly comprising ethylene units in which there are also alkyl acrylate ester units. The ethylene content is at least 60% and preferably at least 70%. Furthermore, the alkyl ester will have no more than 8 carbons and preferably no more than 4 carbons, specific examples being the methyl, ethyl and butyl esters. Of these, copolymers such as ethylene-methyl acrylate and ethylene-butyl acrylate can be cited as preferred examples.

In the present invention, the amount of ethylene-acrylate copolymer is preferably from 3 to 40 wt % in terms of the modified polyolefin. If there is less than 3 wt %, then there is little effect in terms of preventing phase separation, while if there is more than 40 wt % the heat resistance of the polyester may be lowered. A part of the ethylene-acrylate copolymer may undergo thermal decomposition and the moist heat degradation of the polyester may be promoted as a result of the carboxyl terminal groups produced, so it is preferred that as little as possible be employed. From 5 to 35 wt % is further preferred.

The reason why the flexural fatigue resistance is enhanced while maintaining the low-temperature impact resistance and the moist heat degradation resistance by the joint use of an ethylene-glycidyl copolymer and an ethylene-acrylate copolymer along with the polyester, is not clear. However, it is assumed that, since ethylene-acrylate copolymers have inferior thermal stability than ethylene-glycidyl copolymers, but have superior heat resistance compared to ethylene-acrylate-glycidyl terpolymers, by combining an ethylene-glycidyl copolymer and an ethylene-acrylate copolymer, the moist heat resistance is simultaneously improved while still maintaining the low-temperature impact resistance and the compatibility at the ethylene-acrylate-glycidyl terpolymer level.

There may be freely included in the composition of the present invention, known antioxidants, thermal decomposition preventives, ultraviolet absorbers, hydrolysis resistance improvers, colouring agents (dyes and pigments), antistatic agents, electro-conductors, crystallization nucleating agents, crystallization promoters, plasticizers, ready slip agents, lubricating agents, release agents, flame retardants, flame retarding auxiliaries and reinforcing fillers (glass fibre, glass beads, carbon fibre, aramid fibre and the like) within a range such that the characteristics of the present invention are not impaired. For example, in the case of a reinforcing filler, it is necessary to take care that the surface treatment agent thereof or the converging agent be selected such that the objectives of the invention are not impaired.

In the present invention, 'moulded article' refers to an injection moulded article or extrusion moulded article. As examples of injection moulded articles, there are ordinary electrical/electronic components and automobile components. As examples of melt extruded articles, there are fibres, films, sheets, tubes and pipes, etc.

In regard to the composition of the present invention, carrying out the moulding with the polyester and modified polyolefin and/or ethylene-acrylate copolymer already melt-blended will have a considerable effect in terms of preventing phase separation but, from the point of view of the heat resistance and moist heat resistance of the polyester moulded articles, the less the thermal history the better, so it is preferred that direct extrusion moulding be carried out using a screw of a type provided at its tip with a Dulmage or Maddock mixing zone. Of course, it is also possible to supply each component to the moulding machine and then carry out direct injection moulding.

EXAMPLES

Below, the present invention is explained in more specific terms by means of examples, but it goes without saying that the present invention is not to be restricted just to these. Now, in the examples 'parts' and '%' mean parts by weight or percentage by weight respectively. The various properties in these examples were measured by the following methods.
(1) MFR (units: g/10 minutes)
Based on ISO 1133, measurements were carried out at 190° C. under a 2.16 kg load.
(2) Intrinsic viscosity
This was calculated from the solution viscosity measured at 35° C. using a mixed solvent comprising phenol/tetra-chloroethane (weight ratio 60/40).
(3) Terminal carboxyl group concentration
This was measured by the method of A. Conix (Makromol. Chem. Volume 26, page 226)
(4) Low-temperature impact resistance
The Charpy impact strength of a notched test piece was measured maintained at −40° C., based on ISO179.

The various resins employed in this invention were as follows.
A-1: ethylene-glycidyl methacrylate copolymer of MFR 5 containing 8% glycidyl methacrylate
A-2: ethylene-glycidyl methacrylate terpolymer of MFR 6 containing 8% glycidyl methacrylate and 28% methyl acrylate.
B-1: polyethylene in which 9 wt % of methyl acrylate has been copolymerized, of MFR 2.
B-2: polyethylene in which 28 wt % of methyl acrylate has been copolymerized, of MFR 7.
B-3: polyethylene in which 17 wt % of butyl acrylate has been copolymerized, of MFR 7.

Examples 1 and 2, Comparative Examples 1 to 3

Aforesaid resins A and B were mixed with polybutylene terephthalate (hereinafter abbreviated to PBT) of intrinsic viscosity 0.8 and terminal carboxyl group concentration 30, in proportions, by weight ratio, of PBT/A-1/B-3=95/5/0 (sample a, Comparative Example 1), 95/4/1 (sample b, Example 1), 95/2/3 (sample c, Comparative Practical Example 2) and PBT/A-2/B-3=95/4/1 (sample d, Comparative Example 2), after which an injection moulding machine of mould clamping force 80 tons, which was set at 230–250° C., was used to mould test pieces for impact testing and test pieces with a hinge region. In regard to the low-temperature impact values, those for samples a, b, c and d were all around 8 to 10 KJ/m2, and were superior to the PBT blank in which A and B were not incorporated (2 KJ/m2, Comparative Example 3). However, when a flex test was conducted 2000 times at room temperature, whereas there was no difference in samples b, c and d, in the case of sample a slight phase separation was noted in the hinge region. Again, whereas the percentage strength retention after 100 hours treatment in boiling water was 95% for sample b and 90% for sample c, that for sample d was lowered to 87%. For comparison, the level of retention in the case of PBT in which, A and B were not incorporated was only 80%.

Examples 3 and 4, Comparative Example 4

Aforesaid components A and B were supplied relative to polyethylene terephthalate (hereinafter abbreviated to PET)

of intrinsic viscosity 1.0 and terminal carboxyl group concentration 10 to give proportions of PET/A-1/B-1=95/5/0 (sample e, Comparative Example 4), 95/4/1 (sample f, Example 3) and PET/A-1/B-2=95/4/1 (sample g, Example 4), then extrusion carried out by means of an extruder with a screw with a Dulmage type kneading zone at the tip, and after drawing at a draw factor of 92% of the maximum draw ratio, a 3% relaxation heat treatment was carried out and there was obtained 1500 denier/192 filament multifilament yarn. When the multifilament yarns were subjected to a moist heat degradation treatment in a sealed tube, the percentage strength retention after 48 hours was good at about 95% for samples e and f, and 90% for sample g. However, when a bending endurance test was carried out 500 times at room temperature, with sample e there was about 30% fibrillation, whereas with sample f and sample g it was merely 5% and 1% respectively, so outstanding flexural fatigue resistance was shown.

As explained above, in the present invention, by incorporating an ethylene-glycidyl copolymer and ethylene-acrylate copolymer into the polyester, it is possible to obtain moulded articles which, while maintaining low-temperature impact resistance and moist heat resistance, do not exhibit phase separation or fibrillation with repeated deformation and have a good appearance and durability.

What is claimed is:

1. A method of producing a modified polyester moulded article comprising molding a modified polyester composition consisting essentially of component (a) a polyester made from an acid component containing at least 80 mol % of aromatic dicarboxylic acid and a glycol component containing at least 80 mol % of an aliphatic diol, component (b) an ethylene-glycidyl copolymer and component (c) consisting of 5–35 weight percent based on the ethylene-glycidyl copolymer of an ethylene-acrylate copolymer that does not contain comonomers other than ethylene and alkyl acrylate comonomers, wherein the combination of the ethylene-glycidyl copolymer and the ethylene-acrylate copolymer is no more than 5 weight percent based on the modified polyester composition.

2. A method of producing the modified polyester moulded article according to claim 1, wherein the ethylene-glycidyl copolymer is an ethylene-glycidyl methacrylate copolymer.

3. A method of producing the modified polyester moulded article according to claim 1, wherein the alkyl groups of the alkyl acrylate comonomers each independently contain 1 to 8 carbon atoms.

4. A method of producing the modified polyester moulded article according to claim 1, wherein the alkyl groups of the alkyl acrylate comonomers each independently contain 1 to 4 carbon atoms.

5. A method of producing the modified polyester moulded article according to claim 1, wherein the moulded article of claim 1 is moulded by an injection moulding method or melt extrusion method.

6. A modified polyester moulded article prepared according to claim 5, wherein the melt extruded moulded article is in the form of fibre, film, sheet, tube or pipe.

7. A method of producing a modified polyester molded article according to claim 1, wherein the acid component is a diphenyl dicarboxylate acid, a diphenyl ether dicarboxylic acid, a diphenyl sulphone dicarboxylic acid, or a diphenyl ketone dicarboxylic acid.

8. A method of producing the modified polyester molded article according to claim 1, comprising injection molding the molded article in an injection molding machine of mold clamping force 80 tons set at 230–250° C.

9. A method of producing the modified polyester molded article according to claim 1, comprising extrusion molding the molded article with a screw with a kneading zone at the tip, drawing at a draw factor of 92% of the maximum draw ratio, and afterwards carrying out a relaxation heat treatment.

10. A method of producing the modified polyester molded article according to claim 1, wherein the molded article is a 1500 denier/192 filament multifilament yarn.

11. A modified polyester composition consisting essentially of component (a) a polyester made from an acid component containing 80 mol % of an aromatic dicarboxylic acid and a glycol component containing 80 mol % of aliphatic diol, component (b) a modified polyolefin and component (c) consisting of 5–35 weight percent based on the modified polyolefin of an ethylene-acrylate copolymer that does not contain comonomers other than ethylene and alkyl acrylate comonomers, wherein the combination of the modified polyolefin and the ethylene-acrylate copolymer is no more than 5 weight percent based on the modified polyester composition.

12. A modified polyester composition according to claim 11, wherein the polyester is polybutylene terephthalate.

13. A modified polyester composition according to claim 11, wherein the polyester is polyethylene terephthalate.

14. A modified polyester composition according to claim 11, wherein the alkyl groups of the alkyl acrylate comonomers each independently contain 1 to 8 carbon atoms.

15. A modified polyester composition according to claim 11, wherein the alkyl groups of the alkyl acrylate comonomers each independently contain 1 to 4 carbon atoms.

16. A modified polyester composition according to claim 11, wherein the alkyl groups of the alkyl acrylate comonomers each independently are methyl, ethyl or butyl.

17. A modified polyester composition according to claim 16, wherein the alkyl groups of the alkyl acrylate comonomers are methyl groups.

18. A modified polyester composition according to claim 16, wherein the alkyl groups of the alkyl acrylate comonomers are butyl groups.

19. A modified polyester composition according to claim 11, wherein the modified polyester composition has no more than 5% fibrillation after conducting a bending endurance test 500 times at room temperature.

20. A modified polyester composition according to claim 11, wherein the modified polyester composition has a percentage strength retention of at least 95% after 100 hours of treatment in boiling water.

21. A modified polyester composition consisting of a polyester made from an acid component containing 80 mol % of an aromatic dicarboxylic acid and a glycol component containing 80 mol % of aliphatic diol, 4 weight % of an ethylene-glycidyl methacrylate terpolymer and 1 weight % of an ethylene-acrylate copolymer that does not contain comonomers other than ethylene and alkyl acrylate comonomers, wherein the weight percent is based on the weight of the modified polyester composition.

22. A method of producing a modified polyester molded article comprising molding a modified polyester composition consisting of a polyester made from an acid component containing at least 80 mol % of aromatic dicarboxylic acid and a glycol component containing at least 80 mol % of an aliphatic diol, an ethylene-glycidyl copolymer, and 5 to 35 weight percent based on the ethylene-glycidyl copolymer of an ethylene-acrylate copolymer that does not contain comonomers other than ethylene and alkyl acrylate comonomers, wherein the combination of the ethylene-glycidyl copolymer and the ethylene-acrylate copolymer is no more than 5 weight percent based on the modified polyester composition.

23. A modified polyester composition consisting of a polyester made from an acid component containing 80 mol % of an aromatic dicarboxylic acid and a glycol component containing 80 mol % of aliphatic diol, an ethylene-glycidyl copolymer and 5 to 35 weight percent based on the an ethylene-glycidyl copolymer of an ethylene-acrylate copolymer that does not contain comonomers other than ethylene and alkyl acrylate comonomers, wherein the combination of the ethylene-glycidyl copolymer and the ethylene-acrylate copolymer is no more than 5 weight percent based on the modified polyester composition.

24. A modified polyester composition consisting of a polyester made from an acid component containing 80 mol % of an aromatic dicarboxylic acid and a glycol component containing 80 mol % of aliphatic diol, a modified polyolefin and 5 to 35 weight percent based on the modified polyolefin of an ethylene-acrylate copolymer that does not contain comonomers other than ethylene and alkyl acrylate comonomers, wherein the combination of the modified polyolefin and the ethylene-acrylate copolymer is no more than 5 weight percent based on the modified polyester composition.

25. A method of producing a modified polyester moulded article comprising molding a modified polyester composition consisting essentially of component (a) a polyester made from an acid component containing at least 80 mol % of aromatic dicarboxylic acid and a glycol component containing at least 80 mol % of an aliphatic diol, component (b) an ethylene-glycidyl copolymer and component (c) 5–35 weight percent based on the ethylene-glycidyl copolymer of polyethylene into which only alkyl acrylate has been copolymerized, wherein the combination of the ethylene-glycidyl copolymer and the ethylene-acrylate copolymer is no more than 5 weight percent based on the modified polyester composition.

26. A modified polyester composition comprising of component (a) a polyester made from an acid component containing 80 mol % of an aromatic dicarboxylic acid and a glycol component having 80 mol % of aliphatic diol, component (b) a modified polyolefin and component (c) 5–35 weight percent based on the modified polyolefin of polyethylene into which only alkyl acrylate has been copolymerized, wherein the combination of the modified polyolefin and the ethylene-acrylate copolymer is no more than 5 weight percent based on the modified polyester composition.

27. A modified polyester composition comprising a polyester made from an acid component containing 80 mol % of an aromatic dicarboxylic acid and a glycol component containing 80 mol % of aliphatic diol, 4 weight % of an ethylene-glycidyl methacrylate terpolymer and 1 weight % of polyethylene into which only alkyl acrylate has been copolymerized, wherein the weight percent is based on the weight of the modified polyester composition.

28. A method of producing a modified polyester molded article comprising molding a modified polyester composition consisting of a polyester made from an acid component containing at least 80 mol % of aromatic dicarboxylic acid and a glycol component containing at least 80 mol % of an aliphatic diol, an ethylene-glycidyl copolymer, and 5 to 35 weight percent based on the ethylene-glycidyl copolymer of polyethylene into which only alkyl acrylate has been copolymerized, wherein the combination of the ethylene-glycidyl copolymer and the ethylene-acrylate copolymer is no more than 5 weight percent based on the modified polyester composition.

29. A modified polyester composition consisting of a polyester made from an acid component containing 80 mol % of an aromatic dicarboxylic acid and a glycol component containing 80 mol % of aliphatic diol, a ethylene-glycidyl copolymer and 5 to 35 weight percent based on the ethylene-glycidyl copolymer of polyethylene into which only alkyl acrylate has been copolymerized, wherein the combination of the ethylene-glycidyl copolymer and the ethylene-acrylate copolymer is no more than 5 weight percent based on the modified polyester composition.

30. A modified polyester composition comprising a polyester containing an acid component containing 80 mol % of an aromatic dicarboxylic acid and a glycol component containing 80 mol % of aliphatic diol, a modified polyolefin and 5 to 35 weight percent based on the modified polyolefin of polyethylene into which only alkyl acrylate has been copolymerized, wherein the modified polyester composition comprises no more than 5 weight percent of the total of the modified polyolefin and the ethylene-acrylate copolymer.

* * * * *